United States Patent [19]
Funke

[11] Patent Number: 5,646,810
[45] Date of Patent: Jul. 8, 1997

[54] TRANSIENT VOLTAGE SURGE SUPPRESSION AND ELECTRICAL NOISE ATTENUATION CIRCUIT

[76] Inventor: James Funke, 148 Queensland Road, Calgary, Alberta, Canada, T2J 3S2

[21] Appl. No.: 538,226

[22] Filed: Oct. 3, 1995

[51] Int. Cl.⁶ ........................................ H02H 9/00
[52] U.S. Cl. ................ 361/56; 361/58; 361/111; 361/118
[58] Field of Search .................. 361/56, 58, 111, 361/118, 119, 127, 91

[56] References Cited

U.S. PATENT DOCUMENTS 4,870,534  9/1989  Harford ........................... 361/58

Primary Examiner—Jeffrey A. Gaffin
Assistant Examiner—Stephen W. Jackson
Attorney, Agent, or Firm—Dickstein Shapiro Morin & Oshinsky LLP

[57] ABSTRACT

The invention is a combination of an altered AC to DC circuit utilized with typical power protection components for improved power protection purposes. More particularly, in accordance with the present invention there is provided a parallel circuit to protect electrical and electronic equipment from transients from an electrical system. The circuit comprises (a) first uni-directional diodes attached to line, neutral and/or ground connection of the electrical system; (b) a DC capacitor with a positive pole being fed by said first uni-directional diodes; (c) uni-directional diodes attached and feeding back to line, neutral and/or ground connection, said negative pole feeding said second uni-directional diodes; and (d) a discharge resistor in parallel with said DC capacitor.

15 Claims, 8 Drawing Sheets

TRANSIENT VOLTAGE SURGE SUPPRESSION AND ELECTRICAL NOISE ATTENUATION CIRCUIT

FIELD OF THE INVENTION

The present invention relates to alternating current (AC) transient voltage surge suppression (TVSS) and electrical noise attenuation (being referred to hereinafter as "TVSS filtering") incorporated into electrical distribution equipment, electrical power protection devices or within the equipment to be protected.

BACKGROUND OF THE INVENTION

TVSS filters have been available for decades and are not only stand alone power protection devices but are often incorporated into other power protection devices such as voltage regulators and uninterruptable power supplies. The Institute of Electrical and Electronic Engineers (IEEE) has published numerous studies that indicate transients (also called spikes or surges) and noise (also called high frequency low magnitude interference) related problems are the most frequent power disturbance problems. These power disturbances have become more significant as microprocessor use has rapidly expanded. Microprocessors are also becoming more susceptible to transients and noise, causing equipment damage, logic control errors and expensive downtime.

There are many types of TVSS filter solutions. The basic circuit components consist of some combination of the following:

1. Clipping Devices, which are activated by voltage above a certain level and react to voltage only above the level. Typical components include:
   metal oxide varistor (MOV)
   diode or transorb or avalanche diode or zener diode
2. Crowbar devices, which are activated by voltage above certain levels and short the power line until the incoming voltage is lowered to a predetermined level. Typical components include:
   spark gap
   gas tubes
   thyristor (SCR)
3. Electrical noise filter components, which are energy storage devices that react to frequency changes. Typical components include:
   AC capacitors
   inductors or chokes or coils These components can be arranged in a infinite number of circuits creating effective TVSS and TVSS filters. Many circuits have been used for a number of years and a large body of prior art exists such as prior products, electrical engineering teachings and electrical association recommendations.
Patents for TVSS filter circuits include: U.S. Pat. Nos. 4,912,589; 4,628,394; 4,563,720; 4,068,279; 3,793,535 and Canadian Patent No. 1,332,074.

There are many locations where TVSS filter circuits can be applied within a facility. The most common location uses a TVSS device between a wall receptacle and the load to be protected. Another location is within the application or load itself, although the circuits utilized at this location often just contain MOVs. A third location is for a TVSS filter circuit to be attached or designed within the electrical distribution equipment of a facility. This equipment includes circuit breakers, meter panels, panel boards, switch boards, switch gear and motor control centres. The invention can be located in any of the above locations but is most economical when applied in the electrical distribution equipment.

Prior art electrical power protection circuits have dramatically improved with the use of clipping components (especially MOVs) and AC capacitors. MOVs are able to repeatably shunt large transients and are activated by voltage above a certain level. Their limitation is the voltage level at which the MOV begins to react. For a 120 VAC system the nominal peak voltage is 172 VDC. The system VAC can be as high as 127 VAC with a peak voltage of 180 VDC. Hence the MOV cannot begin operations below 180 VDC, at it would quickly deteriorate. The level at which the MOV begins operation is called the maximum continuous operating voltage (MCOV) and the lower it is set, the lower the let through voltage. Let through voltage is the remaining voltage of a transient after being reduced by a power protection device. The problem with setting a lower MCOV for MOVs is that it can dramatically reduce the life of the MOV. To maximize lifetime, 200% or greater MCOV compared to peak voltage (VAC peak=1.414×Vrms) has a very long life and survives the possible problem of continuous over voltage caused by mis-wiring within the electrical system.

Below 115% of peak voltage, a clipping device is very susceptible to utility surges and transients which substantially shorten the component's life. At 115% to 200% a clipping device can be damaged by continuous over voltage and extreme surges while having a reasonable life in a standard environment.

AC capacitors react to voltage frequency changes and hence absorb high frequency electrical noise and small transients. AC capacitors however, release energy back relatively slowly to the system allowing them to be overwhelmed by continuous and severe high frequency electrical noise and harmonics. For higher voltages such as 208, 480, and 600 volt systems, the size and cost of effective AC capacitors can become prohibitive.

The combined use of MOVs and AC capacitors provides a range of protection, from small transients and high frequency electrical noise, to large surges. The combined use also provides current sharing where each component absorbs or shunts a portion of a transient's energy which extends the life of all components. This current sharing is limited by the cost and size constraints of AC capacitors and the MCOV of MOVs. What is required, however, and what the present invention intends to provide, is a component or circuit that can be set near to the peak voltage level to be encountered from the utility and absorb or shunt transients ranging to above 200% of this peak voltage. This would allow much better sizing of AC capacitors as the effect of current sharing, from this invention, would help protect them from continuous electrical noise and harmonics. MOVs could also be set at a higher MCOV, dramatically increasing their life.

Many different arrangements using clipping, crowbar and electrical noise filter devices have been proposed to achieve greater durability and lower the let through voltage. The general result has been greater current sharing through a greater number of components. The present invention has taken a very different approach of using direct current (DC) components within a circuit that achieves low MCOV, long life, and robust current sharing in the 100% to 200% range of peak voltage. When combined with clipping devices and AC capacitors, the total of all devices provides much lower let through voltage and greater durability.

The invention is similar to an AC to DC power supply used in many typical electrical and electronic products. The foremost common power supply circuits are the halfway rectifier (HWR) which is able to handle either positive or negative surges, but not both, the full-wave center tap (FWCT), the dual complimentary rectifier (DCR), these latter two both requiting a center tap transformer while the DCR also requires grounding, significantly reducing the configurations these latter two circuits can be applied to for power protection purposes, and the full-wave bridge (FWB). When altered for power protection, the FWB is able to handle both positive and negative electrical disturbances and work on all electrical configurations. To be utilized for power protection however, such circuits would need to be substantially altered.

While the inventor is not aware of any commercial use of an adaption of the FWB for power protection, three existing patents are known which teach the use of diodes.

U.S. Pat. No. 4,321,644 issued Mar. 23, 1982 does not relate to the invention but the prior art in the patent does. This prior art applies diodes but in a very complex manner with non-disclosed trigger signal devices controlling the diodes. The capacitor appears to be an AC capacitor. The use of an AC capacitor within the circuit would have a zero charge causing a large initial current draw, high recovery time, and rebound effects. The invention has none of these restrictions or the complexity of the circuit.

Canadian Patent No. 1,230,919 dated Dec. 29, 1987 uses DC capacitors but has no resistor and uses Zener diodes. The circuit is designed as a cascade where the DC capacitors handle smaller surges while the Zener diodes activate for large surges. The circuits send transients to ground, unlike the invention, which absorbs transients and then dissipates the energy by utilizing a resistor.

U.S. Pat. Nos. 4,870,528 and 4,870,534 dated Sep. 26, 1989 are replicated in Canadian Patents Nos. 1,332,439 and 1,333,191. We will only deal with U.S. Pat. No. 4,870,534 as it is more generic in nature while U.S. Pat. No. 4,870,528 is a three wire detailed adaptation of U.S. Pat. No. 4,870,534. The patent utilizes the invention circuit for power protection use in a much different manner. Rather than combine the circuit in parallel with MOVs or AC capacitors, the patent goes to lengths to discredit these components for power protection use. Instead the patent relies on a two tiered approach with each tier containing a coil or inductor and then the adoption of the FWB circuit. These two patents limit the circuit's use to series circuits of only one phase. The invention, instead, utilizes parallel circuits with clipping devices (MOVs, Avalanche diodes, Zener diodes) and/or AC capacitors. This dramatically expands the operating amperage range the invention can be utilized for. Series products meanwhile must be accurately sized for their application. Multiple phases with ground and/or neutral configurations can also be utilized with the invention. The LED indicator in the circuit is also not included in the invention's circuit. The parallel nature of the invention circuit allows a signal to be monitored at a sensor board on the device, if monitoring is required.

OBJECTS OF THE INVENTION

The objects of the invention are:
improved power protection performance typically measured as lower let through voltage;
greater durability and longer life for the invention and protected equipment;
lower cost;
smaller size; and
simplicity to manufacture.

SUMMARY OF THE INVENTION

The invention is a combination of an altered AC to DC circuit utilized with typical power protection components for improved power protection purposes.

More particularly, in accordance with the present invention there is provided a parallel circuit to protect electrical and electronic equipment from transients from an electrical system. The circuit comprises (a) first uni-directional diodes attached to line, neutral and/or ground connection of the electrical system; (b) a DC capacitor with a positive pole being fed by said first uni-directional diodes; (c) uni-directional diodes attached and feeding back to line, neutral and/or ground connection, said negative pole feeding said second uni-directional diodes; and (d) a discharge resistor in parallel with said DC capacitor.

The circuit according to the present invention is combined in parallel with clipping devices and/or AC capacitors and/or over current protection, as will be described in more detail hereinafter, to provide the desired protection from transients.

More particularly, the adapted AC to DC circuit consists of:

1. Diodes which convert AC to DC power and trigger levels set as low as 0.7 volts above the peak AC voltage. When a surge or over voltage exceed this trigger level, the diode converts the energy above this level to DC voltage. As the diodes are in a FWB circuit either positive or negative surges will be converted.

2. DC capacitor which absorbs the positive DC electricity converted by the diodes and stores the excess energy. DC capacitors are a much smaller size and have a lower cost compared to comparable AC capacitors, allowing for much greater energy storage. The capacitor, once charged above its trigger level, will discharge the stored energy as positive DC electricity, which must flow through the resistor, as the diodes are uni-directional.

3. The resistor dissipates the DC power which is discharged by the DC capacitor. No electrical energy is released back to the system. Proper sizing of resistors allows for controlled dissipation of energy to the typical charged state of the capacitor which is just above the peak system voltage.

The above circuit is called a DESD circuit (diode to energy storage to dissipation). This new circuit must be included with other power protection components to provide substantially greater performance and durability over other described power protection circuits.

The DESD is to be wired in parallel with the other components of the power protection circuit. These components must consist of clipping devices either before and/or after the DESD and over current devices between the live lines and the rest of the power protection circuit. AC capacitors are optional to provide attenuation of electrical noise. They can be situated either before and/or after the DESD. The power protection circuit is wired in parallel with the electrical system it is protecting.

The DESD circuit has been described an alteration to a FWB which utilizes only a single phase and neutral or ground. The DESD can in fact be altered to handle up to 3 phase and neutral, ground, or both. Two additional diodes for each added phase, neutral or grounded are required.

BRIEF DESCRIPTION OF THE DRAWINGS

These and other advantages of the invention will become apparent upon reading the following detailed description and upon referring to the drawings in which.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

Figure 1:
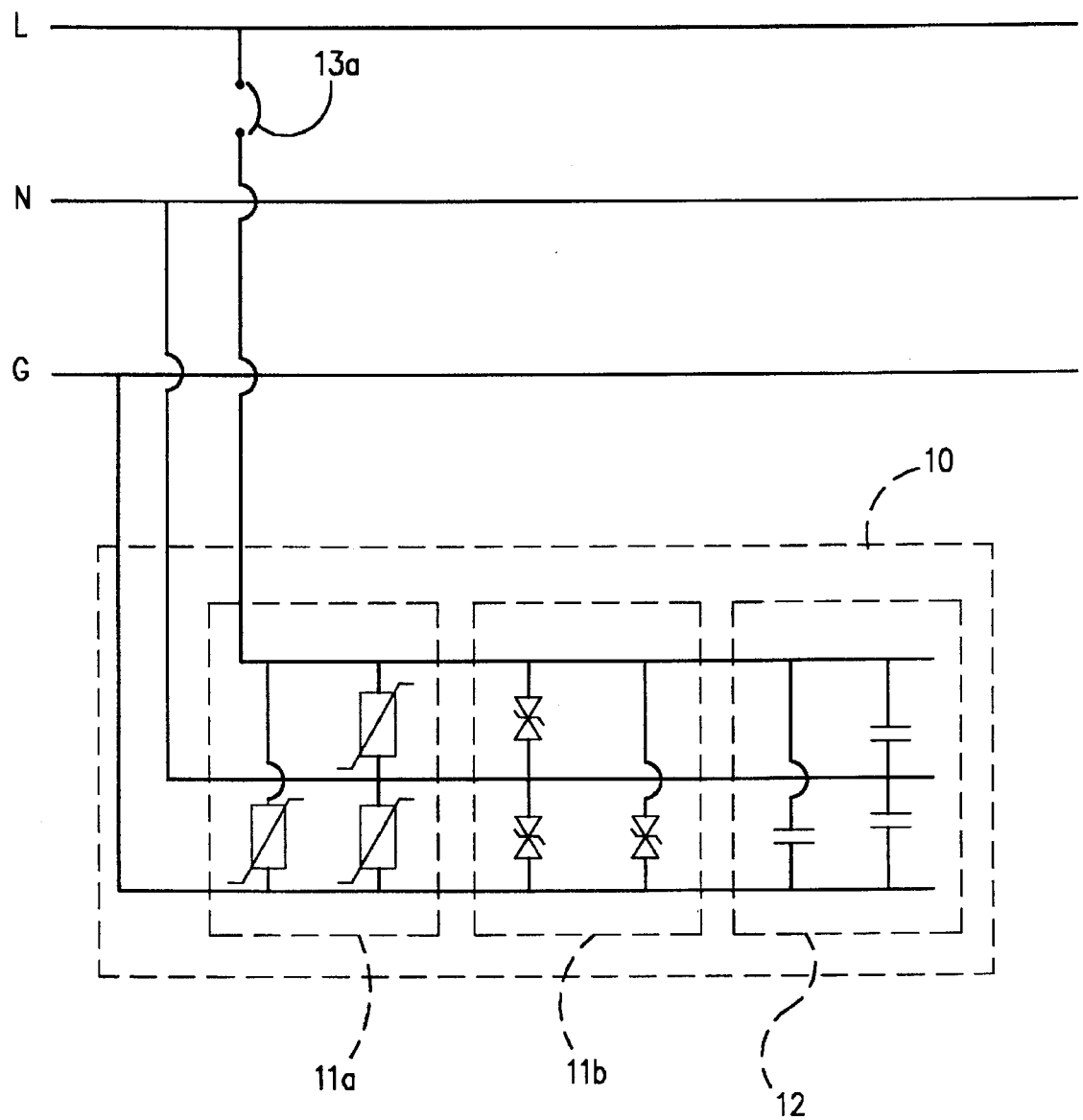
FIG. 1 is a single line schematic of a typical prior art single phase, wye, TVSS filter wired in parallel.

FIG. 1 details a conventional that provides be wye power protection circuit 10 that provides both TVSS and filtering. The TVSS is provided by clipping devices 11a and 11b. 11a are MOVs and 11b are avalanche diodes. Both are wired in parallel across each mode. The filter is provided by AC capacitors 12, again wired in parallel across each mode. The filter is provided by AC capacitors 12, again wired in parallel across each mode. Over current protection if a component at 10 fails short, is provided by a circuit breaker 13a.

To increase performance, clipping and crowbar components with lower let through voltage can be used. However these types have low MCOV that shorten life and reliability. AC capacitors are able to absorb much of the energy between peak system voltage and the trigger voltage level for small surges but has minimum effect for large surges without sacrificing reasonably cost and size. Thus the combinations of clipping components and AC capacitors are limited to either higher let through or much shorter fife and reliability.

For example, a system with one 20 mm MOV would have the following results based on manufacturer's let through results and expected life using ANSI/IEEE C62.41 surge probability medium exposure level.

EXAMPLE 1

| MVOC | Let Through | Expected Life |
| --- | --- | --- |
| 130 | 340 VDC | 12.1 years |
| 150 | 395 VDC | 13.2 years |
| 250 | 650 VDC | 20.5 years |

Figure 2:
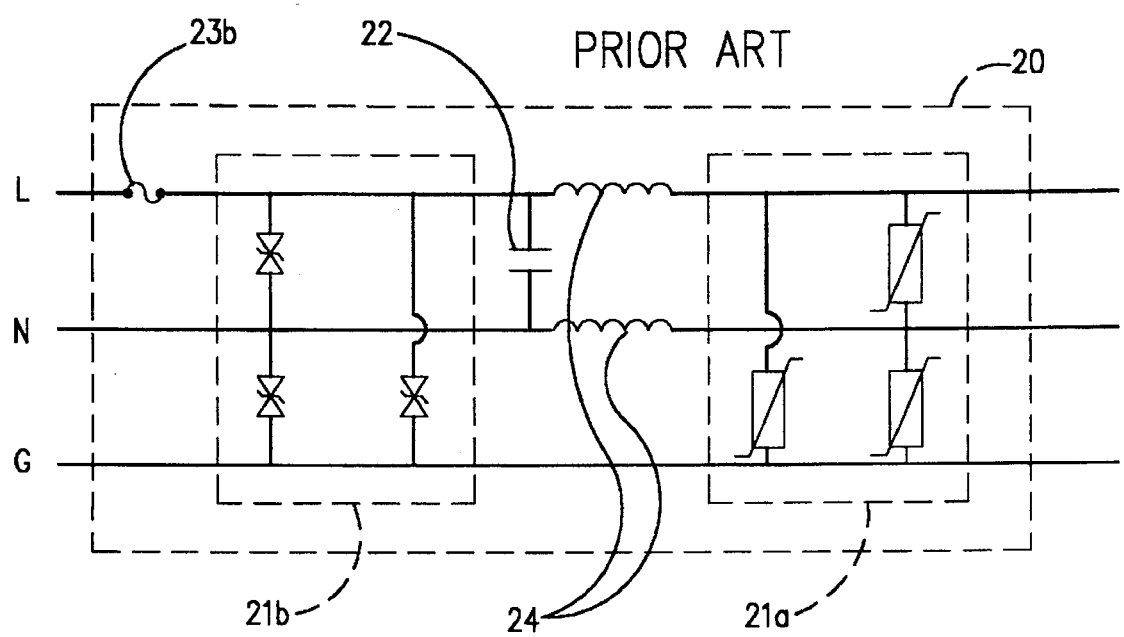
FIG. 2 is a single line schematic of a typical prior art single phase, wye, TVSS filter wired in series.

FIG. 2 illustrates a conventional series filter utilizing clipping devices 21a and 21b, AC capacitor 22, fusing 23b and inductors 24. The use of inductors is for filtering and is used only on series filters. Series filters' greater performance is limited by sizing restrictions as a series filter's components must be sized to the typical amperage and voltage of the system. The invention does not relate to series power protection circuits.

Figure 3:
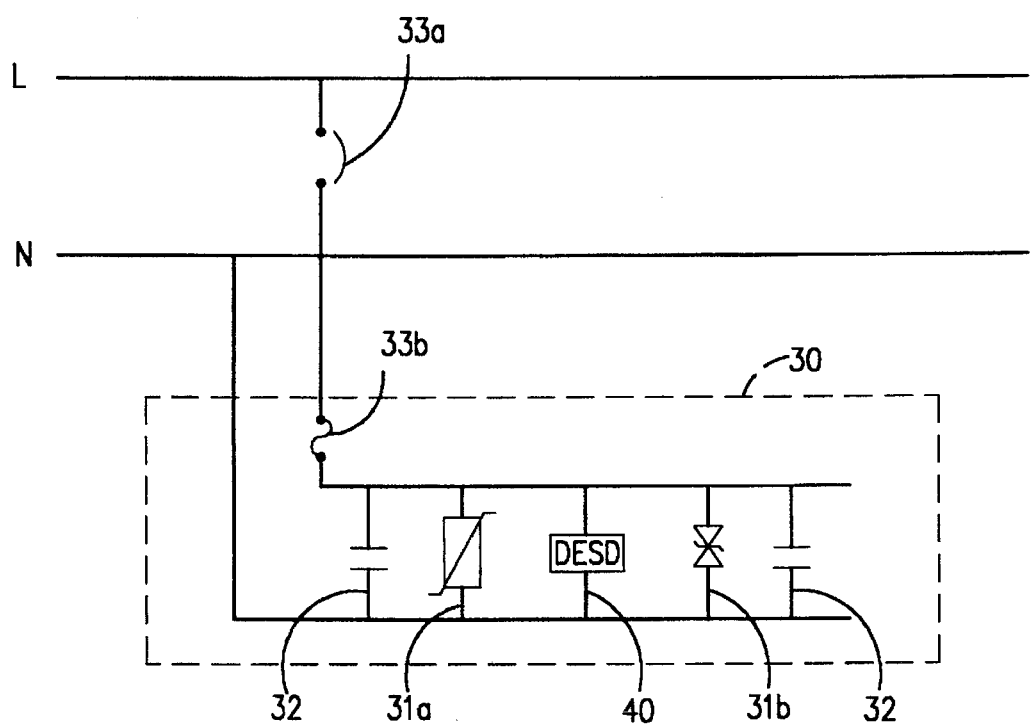
FIG. 3 is a single line schematic of the invention for a single phase, with the DESD circuit not fully detailed.

FIG. 3 outlines possible components to be used in conjunction with the present invention. The DESD circuit 40 of the present invention, detailed later, is wired in parallel across the power protection circuit 30 which is wired in parallel to the electrical system it is protecting. All other components are wired in parallel within the power protection circuit except over current protection on the line wire, which can be either fusing 33b, circuit breaker 33a, or both. To provide TVSS protection, the DESD 40 absorbs some of the surge with clipping device 31a and 31b, which are MOVs and zener diodes, shunting the remainder. AC capacitors 32 are optional to provide electrical high frequency noise attenuation, also called filtering. Their use also provides some current sharing for larger surges causing less stress on other components and lower let through voltage to the protected load. The use of the DESD circuit enhances the performance of AC capacitors as its trigger point is just above the system's peak voltage, allowing current sharing for smaller spikes and electrical high frequency noise.

Figure 4:
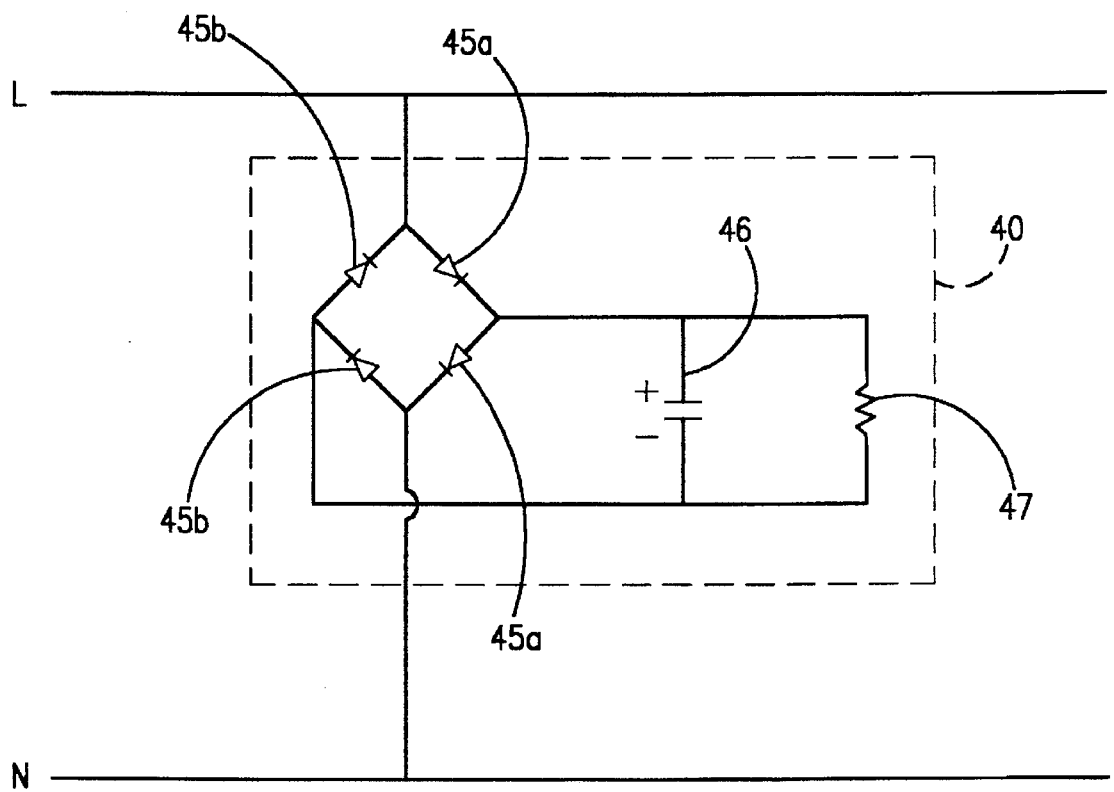
FIG. 4 is a single line schematic of the DESD circuit for a single phase.

FIG. 4 is a schematic of a simple DESD circuit 40 protecting one mode of line to neutral. A positive surge on the line wire of above the peak voltage would trigger the diode 45a flowing from the line wire. The diode would convert the surge to DC electricity which is then absorbed by the DC capacitor 46. The DC capacitor then releases the stored energy in a controlled, steady manner as positive DC power. This power must flow through the resistor 47, as the circuit will only allow the DC power to flow in that direction as diodes 45a are uni-directional. The resistor 47 dissipates the energy in a controlled manner. The DC capacitor returns to a charged state of peak system voltage within seconds. The circuit is hi-directional, or able to handle surges in either direction, as a surge on a neutral would be converted to DC electricity by diode 45a connected to the neutral line. Diodes 45b complete the circuit.

Figure 5:
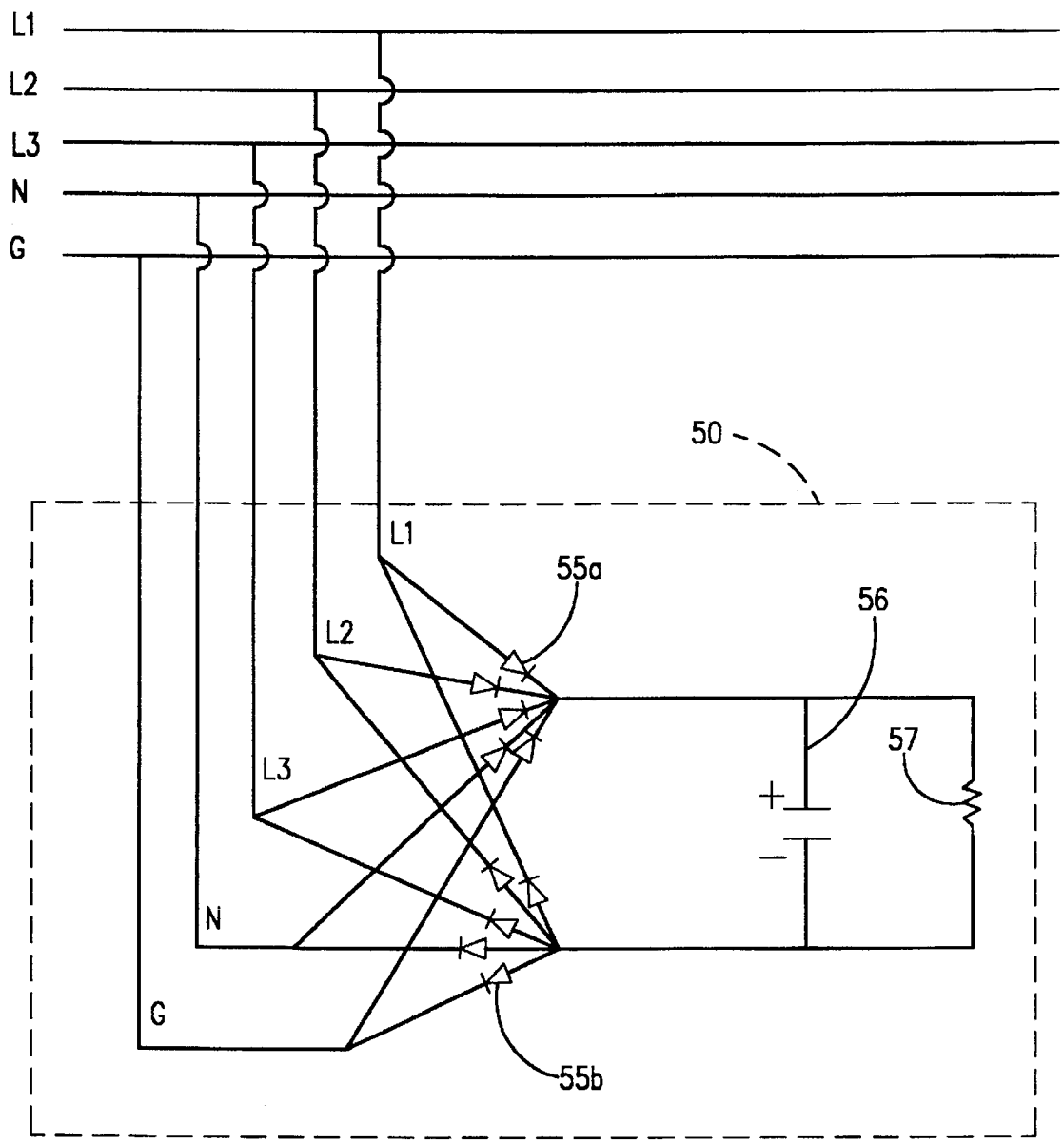
FIG. 5 is a single line schematic of the DESD circuit where all modes are protected for a three phase, wye.

FIG. 5 provides another version of the DESD circuit 50. Rather than protecting a single mode as in FIG. 4, this version protects 10 modes (3 L-L, 3L-N, 3L-G, 1N-G) which are all combinations of a 3 phase, wye system. While the DC capacitor and resistor sizing would change, their basic circuit function would remain the same as in DESD circuit 40. However, five incoming and five outgoing diodes would be used or one incoming and one outgoing per fine, neutral, or ground. As in DESD circuit 40 the incoming diodes are to the positive side of the DC capacitor and the outgoing diodes are from the negative side of the DC capacitor.

One drawback with all modes being protected by a lone DESD circuit is that the DESD trigger point is increased. In FIG. 4, if the line voltage was 120 VAC, the peak system voltage would be 170 VDC and the DESD's trigger voltage would be set just over 170 VDC. For FIG. 5, if each line's voltage was 120 VAC, the three phase system voltage would be 208 VAC and the peak operating voltage would be 294 VDC. Thus, the DESD trigger voltage would be at just over 294 VDC causing the DESD circuit 50 to be less effective than DESD circuit 40.

Figure 6:
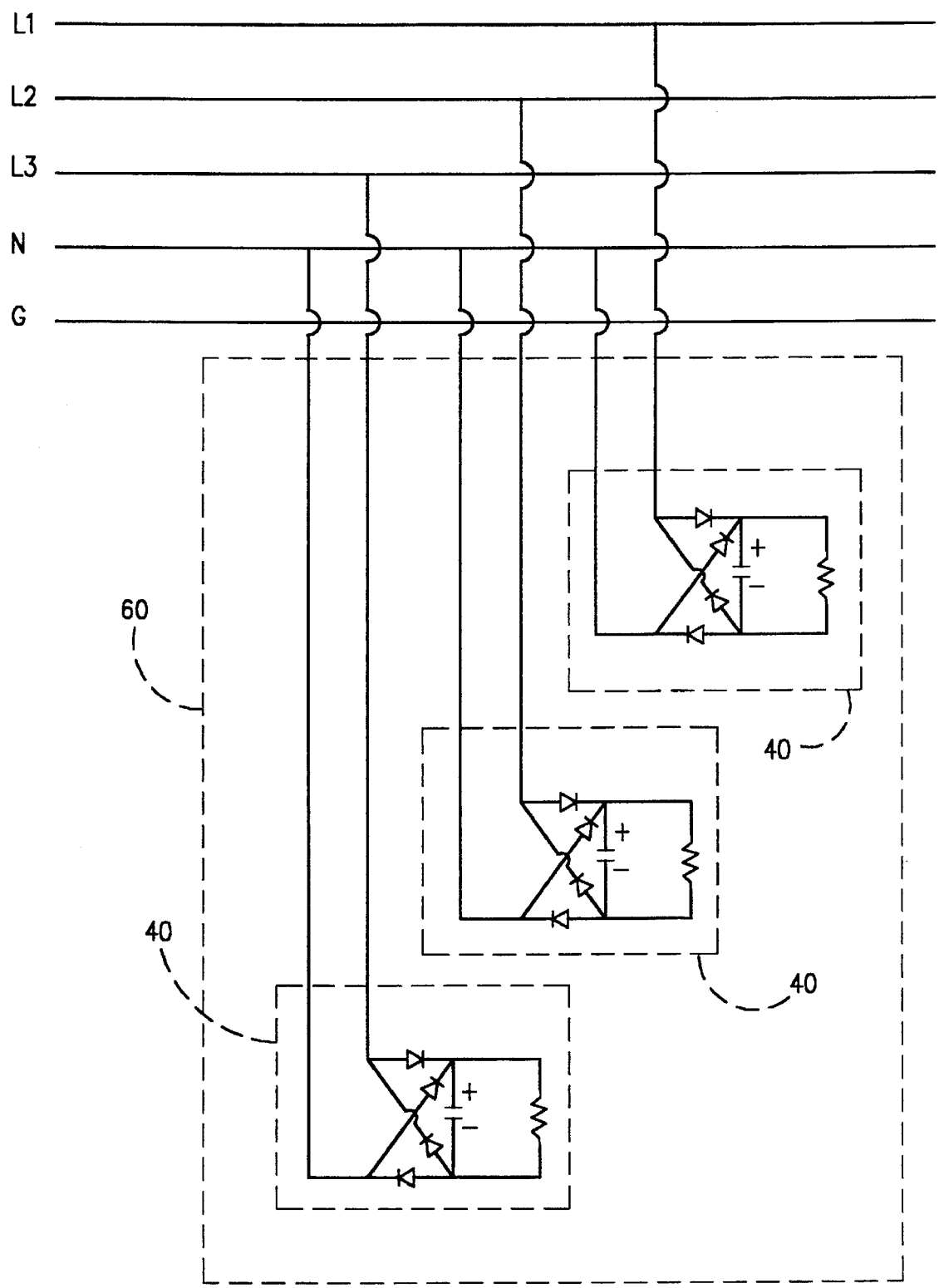
FIG. 6 is a single line schematic of three separate DESD circuits that protect line to neutral modes for a three phase, wye.

FIG. 6 provides a version of the DESD circuit that solves the drawback of DESD version 50. Basically, a simple DESD circuit 40 is provided for each mode that requires added protection. In circuit 60, only three line to neutral modes are protected. This provides the lower trigger point per mode achieving better performance, although at a higher cost and size. This single DESD circuit per mode could be applied to all ten modes requiring ten DESD circuit 40's. The L-N and L-G trigger points for a 120/208 three phase system would be at 170 VDC. If circuit 40 was applied to other modes, their trigger points would be 295 VDC (208 VAC) for L-L and 1 VDC for neutral to ground.

Figure 7:
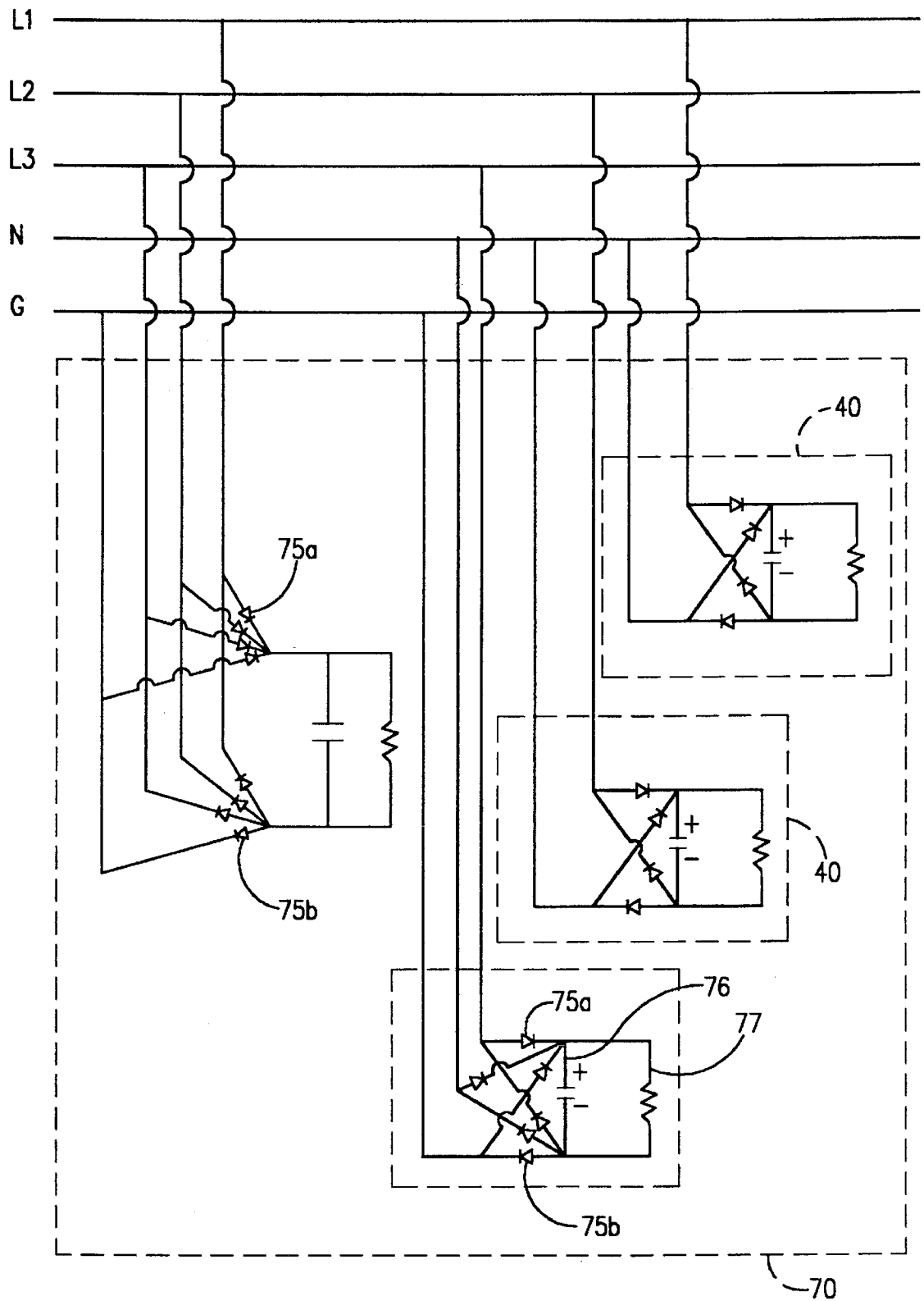
FIG. 7 is a single line schematic of four separate DESD circuits that protect all modes for a three phase, wye.

FIG. 7 is an example of the combinations between DESD circuits 40 and 50 to create a circuit 70 that provides both performance and cost effectiveness. DESD circuit 40 is utilized for two of the three line to neutrals with the third line to neutral including ground. This protects neutral to ground at a trigger point of 170 VDC for a 120/208 three phase system. Line to ground is protected under a DESD circuit that combines the three lines and ground. The trigger point for these modes is 295 VDC. Hence all modes are protected with four DESD circuits, which saves on cost and size, but protects certain modes to a greater degree as their trigger points are lowered.

Figure 8:
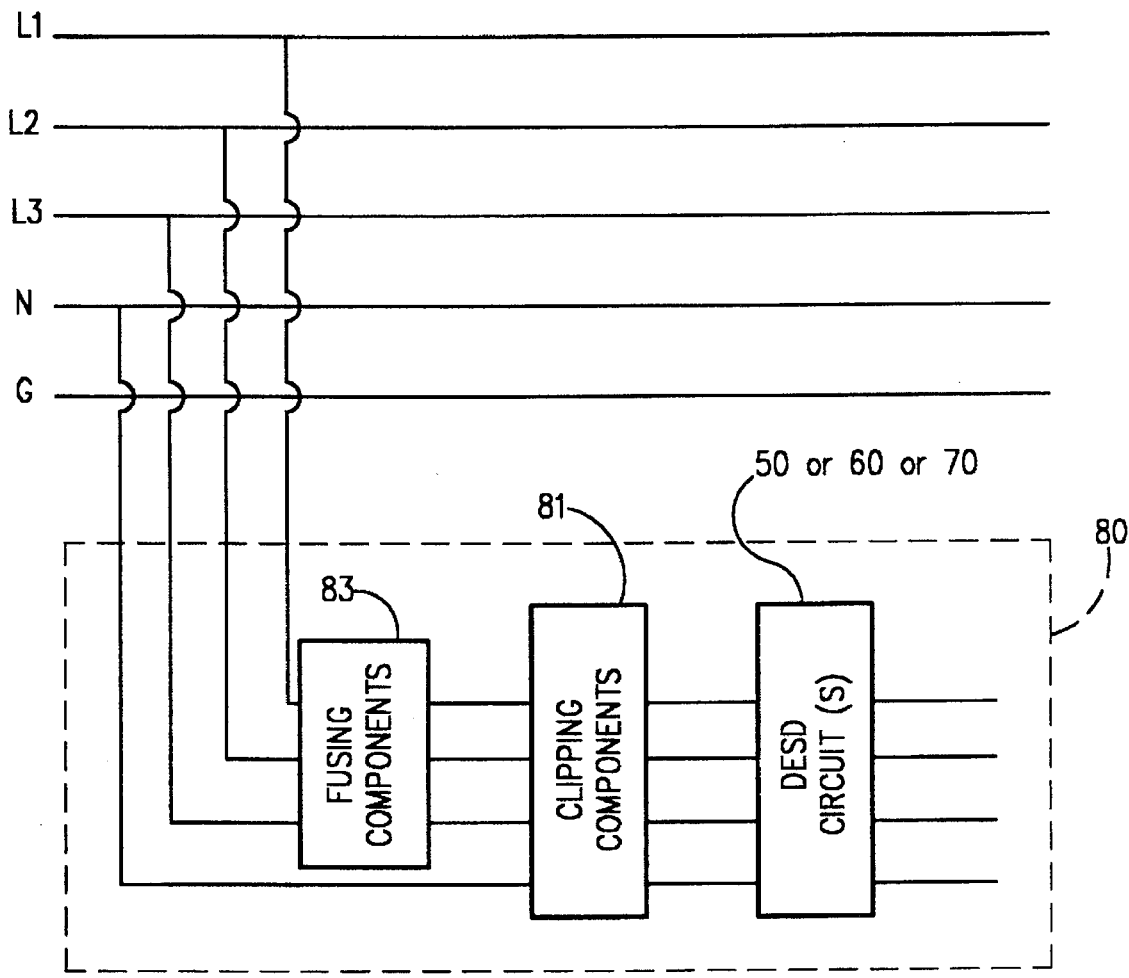
FIG. 8 is a single line schematic of minimum types of power protection components to be utilized with the DESD circuit(s) for a three phase wye system.

FIG. 8 provides an overview of the minimum combination of types of components with the DESD circuit(s) which, when combined, provide a TVSS power protection circuit. The DESD circuit(s) must be included and can be as in 50, 60, 70, or some other combination within a circuit 80. Not all modes need to protected with DESD, although for maximum protection, this is advisable.

Clipping devices 81, such as MOVs, avalanche diodes (also called transorbs and zener diodes) must be included and be wired in parallel. Not all modes need to be protected, although for maximum protection, this is advisable.

The clipping and DESD circuit components must be separated from the parallel connection to the rest of the system by some type of over current device on the line wire. FIG. 8 this is achieved by fusing components 83.

Figure 9:
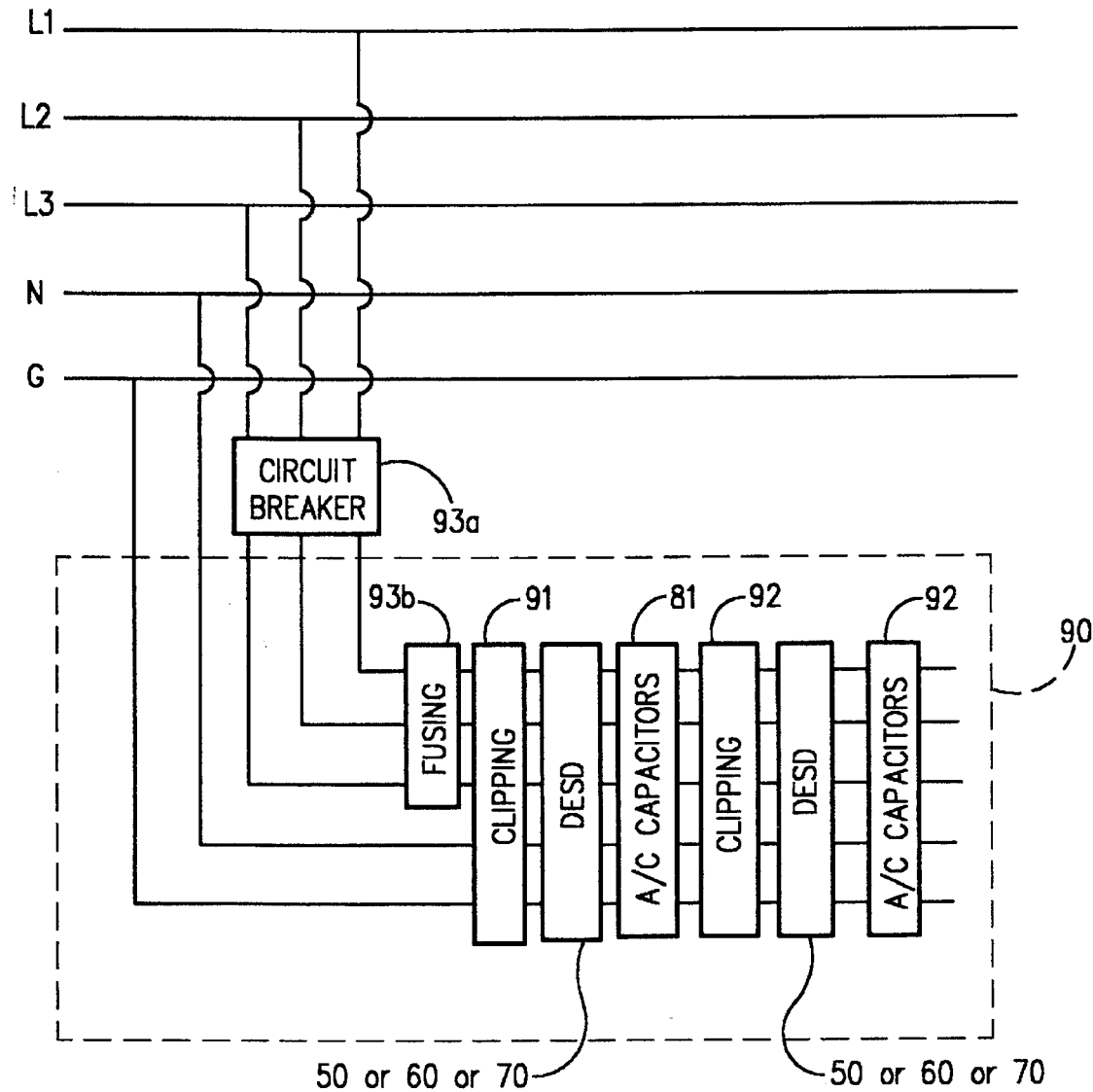
FIG. 9 is a single line schematic of the maximum types of power protection components to be utilized with the DESD circuit(s) for a three phase wye system.

FIG. 9 provides a more elaborate version of the invention as circuit 90. Two DESD circuit(s) of 50, 60, or 70 blocks are provided although the duplication is unlikely to improve performance significantly. Dual clipping component blocks 91 improve performance, durability, and life because of current sharing. Within a mode, multiple clipping or AC capacitor components, all parallel with each other, may exist. This provides further performance and durability of components. If a component fails short, fusing components will open. If a component fails and remains open, duplicate components can continue to operate. AC capacitors provide filtering and two blocks of AC capacitors (92) will improve performance and durability.

The entire circuit is separated from the parallel connection to the electrical system by over current protection on the line wires. Fusing 93b is included within the power protection circuit 90 while the circuit is wired into circuit breaker 93a for added protection. In some circumstances circuit breakers 93a may suffice.

The above explanation and figures explain the use of the DESD circuit within parallel connected power protection circuits utilizing fusing, clipping devices, and AC capacitors. For three phase electrical systems, while the above explanation and figures describe a 120/208 system use of the DESD circuit in accordance with the invention, it is also envisaged that this invention extends to other typical three phase systems such as a 277/480 system, (in which case the L-N trigger point would be at just over 392 VDC and L-L at just over 679 VDC) and a 347/600 system (in which case the L-N trigger point would be at just over 490 VDC and L-L at just over 848 VDC). The advantages of the DESD circuit become apparent when comparing the use of this circuit to other power protection components. The DESD circuit has the following advantages:

1. Clipping and crowbar devices with low trigger points which reduce the let through voltages, have low MCOV which shortens their life, and reliability. The DESD circuit has a trigger point at approximately the peak voltage of the power system which substantially reduces let through voltage. The DC components within the DESD circuit are not prone to deterioration for low MCOV which substantially extends its life and increases reliability.
2. Where mis-wiring or other causes creates extended over voltage which is above the trigger point of clipping devices, these devices will quickly fail. In similar circumstances, the DESD reaches a charge on the DC capacitor which it would then hold. No long term damage would result to the DESD circuit. This robustness of the DESD circuit allows clipping devices to have higher trigger points within the power protection circuit. For example, on a three phase system, two phases incorrectly combined create 208 VAC. With the invention, clipping device trigger points can be set above this level with the assurance that performance is not lost due to the DESD.
3. AC capacitors have higher costs and prohibitive sizes than have the DC components used in the DESD especially at higher voltages and currents. Thus the DESD allows smaller and more economical DC capacitors to be used as the DESD circuit is able to handle much of the energy AC capacitors once handled between 100% to 200% of peak system voltage.
4. Harmonic resonance requires AC capacitor and inductor components to carry much greater currents under normal operations and during power disturbances. This substantially reduces the life of the AC power protection components. The DESD is immune to harmonics as all its components are DC components which are immune to harmonics.
5. Crowbar devices are inherently slower and have, in comparison, a very high clamp voltage. During operation they will short out the power line. The DESD circuit has a very low trigger voltage at approximately peak system voltage and will not reduce or short the system voltage.
6. The DESD has much higher energy storage than AC capacitors at similar cost or size.
7. Energy from the DESD is not released back into the system.
8. DESD provides the majority of current sharing in the most vulnerable range of power disturbances for clipping and AC capacitor components. This range is between 100% and 200% of peak system voltage.
9. For prolonged over voltage above the DESD circuit trigger point the DESD is not damaged where clipping devices are quickly destroyed when exposed to prolonged over voltage above their trigger point.

Thus, it is apparent that there has been provided in accordance with the invention an improved transient voltage surge suppression and electrical noise attenuation circuit that fully satisfies the objects, aims and advantages set forth above. While the invention has been described in conjunction with example embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A parallel circuit to protect electrical and electronic equipment from transients from an electrical system comprising:

(a) first uni-directional diodes directly attached to line, neutral and/or ground connection of the electrical system;

(b) a DC capacitor with a positive pole being fed by said first uni-directional diodes;

(c) second uni-directional diodes directly attached and feeding back to line, neutral and/or ground connection, and being fed from a negative pole of the DC capacitor; and (d) a discharge resistor in parallel with said DC capacitor.

2. A circuit according to claim 1 in combination with AC capacitor means attached in parallel.

3. A circuit according to claim 1 wherein the first and second uni-directional diodes have a trigger level set slightly in excess of peak AC system voltage.

4. A circuit according to claim 3 for protecting one mode of line to neutral, wherein the line voltage is about 120 VAC and the peak system voltage is about 170 VDC, the trigger voltage of the diodes being set at slightly in excess of 170 VDC.

5. A circuit according to claim 3 for protecting a three phase system, wherein the three phase system voltage is 208 VAC and the peak operating voltage is 294 VDC, the trigger voltage of the diodes being set at slightly in excess of 294 VDC.

6. A circuit according to claim 3 for protecting one mode of line to neutral wherein the line voltage is about 277 VAC and the peak system voltage is about 392 VDC, the trigger voltage of the diodes being set at slightly in excess of 392 VDC.

7. A circuit according to claim 3 for protecting one mode of line to neutral wherein the line voltage is about 347 VAC and the peak system voltage is about 490 VDC, the trigger voltage of the diodes being set at slightly in excess of 490 VDC.

8. A circuit according to claim 1 in combination with clipping device means attached in parallel.

9. A circuit according to claim 8 further comprising over current protection means located between said circuit and clipping device, and the electrical system.

10. A circuit according to claim 8 wherein said clipping devices are selected from the group comprising metal oxide varistors, zener diodes, avalanche diodes, and transorb diodes.

11. A circuit according to claim 8 in combination with AC capacitor means attached in parallel.

12. A circuit according to claim 11 for protecting one mode of line to neutral, wherein the line voltage is about 120 VAC and the peak system voltage is about 170 VDC, the trigger voltage of the diodes being set at slightly in excess of 170 VDC.

13. A circuit according to claim 11 for protecting a three phase system, wherein the three phase system voltage is 208 VAC and the peak operating voltage is 294 VDC, the trigger voltage of the diodes being set at slightly in excess of 294 VDC.

14. A circuit according to claim 11 for protecting a three phase system wherein the three phase system voltage is 480 VAC and the peak operating voltage is 679 VDC, the trigger voltage of the diodes being set at slightly in excess of 679 VDC.

15. A circuit according to claim 11 for protecting a three phase system, wherein the three phase system voltage is 600 VAC and the peak operating voltage is 848 VDC, the trigger voltage of the diodes being set at slightly in excess of 848 VDC.

* * * * *